(12) United States Patent
Chen et al.

(10) Patent No.: US 11,763,166 B2
(45) Date of Patent: Sep. 19, 2023

(54) METHOD FOR REAL TIME OPTIMIZATION AND PARALLEL COMPUTING OF MODEL PREDICTION CONTROL BASED ON COMPUTING CHART

(71) Applicant: TONGJI UNIVERSITY, Shanghai (CN)

(72) Inventors: Hong Chen, Shanghai (CN); Qiang Meng, Shanghai (CN); Lin Zhang, Shanghai (CN); Haoqi Hu, Shanghai (CN); Bin Li, Shanghai (CN)

(73) Assignee: TONGJI UNIVERSITY, Shanghai (CN)

( * ) Notice: Subject to any disclaimer, the term of this patent is extended or adjusted under 35 U.S.C. 154(b) by 135 days.

(21) Appl. No.: 17/562,001

(22) Filed: Dec. 27, 2021

(65) Prior Publication Data
US 2022/0327388 A1  Oct. 13, 2022

(30) Foreign Application Priority Data
Mar. 31, 2021 (CN) .......................... 202110344736.0

(51) Int. Cl.
*G06N 3/084* (2023.01)
*G06N 5/02* (2023.01)

(52) U.S. Cl.
CPC ............... *G06N 3/084* (2013.01); *G06N 5/02* (2013.01)

(58) Field of Classification Search
CPC .................................. G06N 3/084; G06N 5/02
See application file for complete search history.

(56) References Cited

U.S. PATENT DOCUMENTS

2021/0276588 A1* 9/2021 Kabzan ................. B60W 10/20
2022/0324484 A1* 10/2022 Hruschka .......... B60W 30/0956

OTHER PUBLICATIONS

Tomas-Gabarron, Juan-Bautista, Esteban Egea-Lopez, and Joan Garcia-Haro. "Vehicular trajectory optimization for cooperative collision avoidance at high speeds." IEEE Transactions on Intelligent Transportation Systems 14.4 (2013): 1930-1941. (Year: 2013).*

* cited by examiner

*Primary Examiner* — Kevin W Figueroa
(74) *Attorney, Agent, or Firm* — JCIP GLOBAL INC.

(57) ABSTRACT

The disclosure relates to a method for real time optimization and parallel computing of model prediction control based on a computing chart, comprising the following steps: building a prediction model of a system state amount and building a target function of a system; building a parallel computing architecture for model prediction control of a prediction model and the target function and employing a triggering parallel computing method by the parallel computing architecture to synchronously compute the prediction model and the target function; and solving and computing a gradient with a manner of back propagation and using a gradient descent method to optimize a control amount of the system and realize real time optimal control of the system. Compared with the prior art, the present disclosure greatly improves a computing efficiency, ensures real time property of a model prediction controller, and extends application fields of model prediction control.

4 Claims, 9 Drawing Sheets

METHOD FOR REAL TIME OPTIMIZATION AND PARALLEL COMPUTING OF MODEL PREDICTION CONTROL BASED ON COMPUTING CHART

CROSS-REFERENCE TO RELATED APPLICATION

This application claims the priority benefit of China application serial no. 202110344736.0, filed on Mar. 31, 2021. The entirety of the above-mentioned patent application is hereby incorporated by reference herein and made a part of this specification.

BACKGROUND

Technical Field

The present invention relates to the technical field of real time optimization for model prediction control and in particular, relates to a method for real time optimization and parallel computing of model prediction control based on a computing chart.

Description of Related Art

Since model prediction control is featured by rolling optimization, feedback adjustment and explicit considerations of a system restraint, thus increasing application fields, especially a rapid and dynamic system (such as electronic power, mechatronics engineering, automobile electronics and the like) urgently need model prediction control to process its complicated restraint optimization problem and improve a control property. However, a current control action of model prediction control is obtained by solving an optimal control problem of an open loop in a limited time domain through a model at each sampling moment, relating to numerous computing amount and time. Therefore, large computing amount for online optimization of model prediction control is a main bottleneck of limiting its application.

In the recent years, many valuable achievements have been made for study of rapid computing for prediction control. In a control policy aspect, a design is optimized and a solution process of prediction control is simplified through a controller structure, which effectively reduce a computing complexity. However, the existing methods are mostly serial computing policies in a time domain, with limited speed upgrading space. In an aspect of solving an optimization problem, the existing methods mostly adopt a standard or improved planning algorithm for iterative computing of solution. However, direct solution of a nonlinear optimization problem relates to a large number of complicated computing of gradient and a computing of a matrix inversion, resulting in a very large computing amount. Meanwhile, a general iterative logic for optimization is rather complicated and it belongs to a serial iterative algorithm mostly. The characteristic determines that they are not equipped with a large parallel accelerating space, such that a speed of each iteration can be accelerated as far as possible. This point depends on increasing speed of a processor to a great extent and creates disadvantages for parallel implementation of hardware.

SUMMARY

The objective of the present invention is to overcome the existing defect of the prior art by providing a method for real time optimization and parallel computing of model prediction control based on a computing chart.

The objective of the present invention can be realized through the following technical solution:

A method for real time optimization and parallel computing of model prediction control based on a computing chart comprises the following steps:

S1: building a prediction model of a system state amount and building a target function of a system;

S2: building a parallel computing architecture for model prediction control of a prediction model and the target function and employing a triggering parallel computing method by the parallel computing architecture to synchronously compute the prediction model and the target function; and S3: solving and computing a gradient with a manner of back propagation and using a gradient descent method to optimize a control amount of the system and realize real time optimal control of the system.

Preferably, in the parallel computing architecture for model prediction control in the step S2, a symbol indicating that solution of the prediction model and the target function in a present step has been completed is used as a symbol of starting a prediction computing at a next step, thereby realizing parallel computing of the prediction model and the target function.

Preferably, a recurrence relationship between the prediction model and the target function is:

$$
\begin{aligned}
i=0 \quad & J_0 = \sum_{i=0}^{N-1} \Delta u_{k+i|k}^T R \Delta u_{k+i|k} & x_{k+1|k} = f(x_{k|k}, u_{k|k}) \\
i=1 \quad & J_1 = J_0 + x_{k+1|k}^T Q x_{k+1|k} & x_{k+2|k} = f(x_{k+1|k}, u_{k+1|k}) \\
& \vdots & \\
i=N-1 \quad & J_{N-1} = J_{N-2} + x_{k+N-1|k}^T Q x_{k+N-1|k} & x_{k+N|k} = f(x_{k+N-1|k}, u_{k+N-1|k}) \\
i=N \quad & J = J_{N-1} + x_{k+N|k}^T P x_{k+N|k}
\end{aligned}
$$

wherein J is a target function, $f$ is a prediction model of a system, $x_{k+i|k}$ is a system state amount in step i at moment k and $u_{k+i|k}$ is a system control amount in step i at moment k.

Preferably, the step S4 specifically comprises:

S41: building a plurality of computing nodes, and setting one storage unit for each computing note, the storage unit storing a related computing parameter;

S42: obtaining a gradient of a target function for an input amount based on back propagation according to the computing parameter in the plurality of computing nodes; and S43: using a gradient descent method to optimize a control amount of the system, and obtaining an optimal control sequence, thereby realizing parallel prediction control of the system.

Preferably, the step S43 specifically comprises:

using a gradient descent method to optimize a control amount:

$$u_{k|k}, u_{k-1|k} \ldots u_{k+N-1|k},$$

wherein $u_{k|k}, u_{k+1|k} \ldots u_{k+N-1|k}$ is a control amount in step 0, 1 … N−1 within moment k, completing an optimization process when one of optimization conditions is satisfied, thereby obtaining an optimal control sequence U*$^k$:

$$U^*_k = [\mathcal{u}^*_{k|k}, \mathcal{u}^*_{k+1|k} \ldots \mathcal{u}^*_{k+N-1|k}],$$

wherein $\mathcal{u}^*_{k|k}, \mathcal{u}^*_{k+1|k} \ldots \mathcal{u}^*_{k+N-1|k}$ is a desired value of a control amount in step 0, 1 ... N−1 within moment k, using a first element $\mathcal{u}^*_{k|k}$ in the obtained optimal control sequence U*$_k$ as a control amount at moment k, and a new control sequence consisting of a zero element added after an element subsequent to the first element as an initial value of a prediction control input matrix at moment k+1, i.e. $U_{0|k+1} = [\mathcal{u}^*_{k+1|k}, \mathcal{u}^*_{k+2|k} \ldots \mathcal{u}^*_{k+N-1|k}, 0]$, and ending an prediction and optimization process at moment k, and repeating the above steps to complete a prediction and optimization process at moment k+1.

Preferably, a computing formula of the optimal control sequence is:

$$u^*_{k|k} = u^*_{k-1|k-1} - \frac{\partial J}{\partial u_{k|k}} \Delta t$$

$$u^*_{k+1|k} = u^*_{k|k} - \frac{\partial J}{\partial u^*_{k+1|k}} \Delta t$$

$$\vdots$$

$$u^*_{k+N-1|k} = u^*_{k+N-2|k} - \frac{\partial J}{\partial u^*_{k+1|k}} \Delta t$$

wherein $\mathcal{u}^*_{k\leq i|k}$ is a desired value of a control amount of step i at moment k, $\mathcal{u}^*_{k-1|k-1}$ is an optimal control amount of the previous moment and Δt is a control step size.

Preferably, the optimization condition is that a difference value between a target function of a present iterative step size and a target function of a previous step is smaller than a set value or reaches limited optimization times or a changing amount of a target function is 0.

Preferably, the system is a vehicle model and the prediction model is a vehicle path and speed tracking model.

Preferably, the control objective of the vehicle path and speed tracking model is:

rapidly and accurately tracking a vehicle longitudinal velocity v$_s$ and a lateral displacement Y, and setting a control time domain and a prediction time domain both as N and a target function as $$\min_U J = \sum_{i=0}^{N-1} (x_i^T Q x_i + u_i^T R u_i) + x_N^T P x_N$$

wherein x$_i$ is a state amount of step i at a present moment, $\mathcal{u}_i$ is a system control amount of step i at the present moment, Q is a positive weight matrix, P is a positive terminal penalty matrix and R is a positive control amount penalty matrix.

Preferably, the target function is decomposed as follows upon being computed:

$$J_0 = g(U) = \sum_{i=0}^{N-1} u_i^T R u_i$$

-continued
$$J_i = h(y_i, J_{i-1}) = J_{i-1} + (y_i - y_r)^T Q(y_i - y_r)$$
$$= (x_{ji} - x_{jr})^T Q(x_{ji} - x_{jr}), j = 1, 6, i = 1, 2, \ldots, N$$

wherein g and h are respectively a decomposition computing function.

Compared with the prior art, the present invention proposes an architecture for parallel computing with a forward solution and a target function solution based on a multi-instruction and multi-data parallel computing concept and in considering coupling of parallel task data combined with a triggering parallel computing manner, sequence of data computing number is ensured and the objective of shortening the computing time is finally achieved. Meanwhile, based on the concept of the computing chart, the architecture uses a process of solving a prediction state with a forward propagation as a node, and the node comprises an input amount, an output amount and a partial derivative of the input amount to the output amount. Through the manner of back propagation, the partial derivative of input and output stored in the node is taken out in order and multiplied to compute a gradient. Generally, a dimension of a control sequence matrix in model prediction control is higher than a dimension of a target function matrix. Therefore, relative to forward computing, inverse computing can reduce operation times to further improve operation efficiency greatly, ensure real time property of a model prediction controller and expand application fields of model prediction control, such that the inverse computing is highly practical and applicable.

DESCRIPTION OF THE EMBODIMENTS

The present invention is described in detail below with reference to the accompanying drawings and specific embodiments. It should be noted that the following descriptions of embodiments are merely illustrative in substance, as the present invention does not intend to limit its applicable objects or functions and the present invention does not limit the following embodiments:

Embodiments

Figure 1:
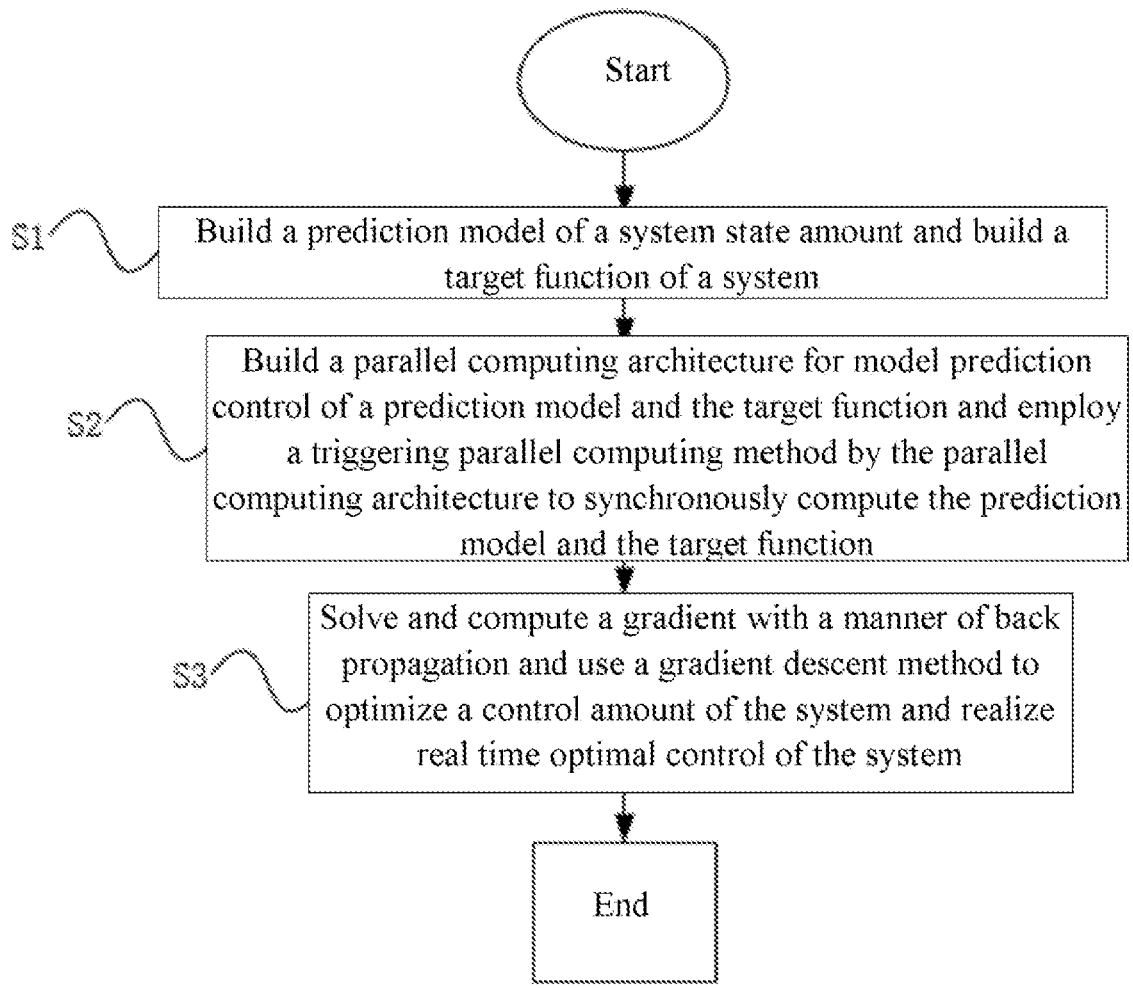
FIG. 1 is a flow chart of the present invention.

A method for real time optimization and parallel computing of model prediction control based on a computing chart, as shown in FIG. 1, comprises the following steps:

S1: building a prediction model of a system state amount and building a target function of a system;

In the embodiment, the following control system is considered:

A system discrete kinetic equation is: $x_{k+1} = f(x_k, u_k)$;

A system output amount is equal to a system state amount, i.e. $y = \chi$;

A system desired output is a zero matrix, i.e. $y^r = 0$;

A control objective is to minimize a quadratic sum of a prediction error and a quadratic sum of a changing rate in a control sequence simultaneously; and A control time domain is equal to a prediction time domain, as N.

Figure 2:
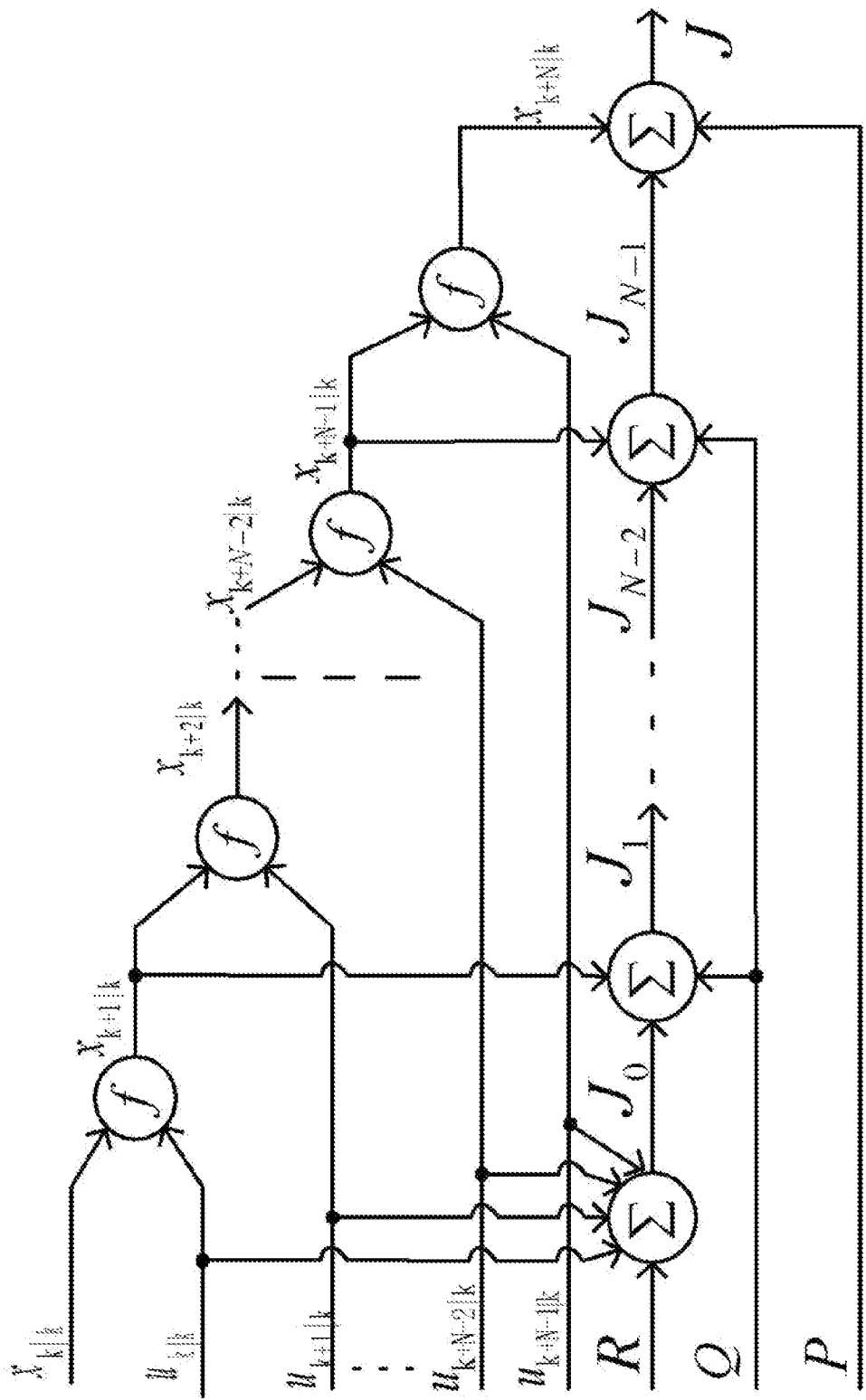
FIG. 2 is a computing model diagram of a recursive process for a future state of a prediction system of the present invention.

According to the above system combined with a chart model concept, the computing model of the recursive process for the future state of the following prediction system as shown in FIG. 2 can be obtained, wherein $x_{k|k}$ is a system amount at moment k, $u_{k|k}$ is an input amount at moment k, $f$ is a recurrence function (a prediction model), J is a target function to be optimized, P is a weight matrix of a terminal, Q is a state weight matrix and R is a weight matrix of a control amount.

A recurrence relationship between the prediction model and the target function is:

$$i = 0 \quad J_0 = \sum_{i=0}^{N-1} \Delta u_{k+i|k}^T R \Delta u_{k+i|k} \quad x_{k+1|k} = f(x_{k|k}, u_{k|k})$$

$$i = 1 \quad J_1 = J_0 + x_{k+1|k}^T Q x_{k+1|k} \quad x_{k+2|k} = f(x_{k+1|k}, u_{k+1|k})$$

$$\vdots$$

$$i = N-1 \quad J_{N-1} = J_{N-2} + x_{k+N-1|k}^T Q x_{k+N-1|k} \quad x_{k+N|k} = f(x_{k+N-1|k}, u_{k+N-1|k})$$

$$i = N \quad J = J_{N-1} + x_{k+N|k}^T P x_{k+N|k}$$

wherein J is a target function, $f$ is a prediction model of a system, $x_{k+i|k}$ is a system state amount in step i at moment k and $u_{k+i|k}$ is a system control amount in step i at moment k.

S2: building a parallel computing architecture for model prediction control of a prediction model and the target function and employing a triggering parallel computing method by the parallel computing architecture to synchronously compute the prediction model and the target function. In the parallel computing architecture for model prediction control in the step S2, a symbol indicating that solution of the prediction model and the target function in a present step has been completed is used as a symbol of starting a prediction computing at a next step, thereby realizing parallel computing of the prediction model and the target function.

According to the above forward computing process, a computing program is programmed. Each node built corresponds to a storage unit of a single chip microcontroller and comprises the following five parts. With a node at $x_{k+N-1|k}$ as an example, when forward computing is finished, output of each node and a partial derivative corresponding to the node are stored in a corresponding storage space.

$x_{k+N-1|k}$ $u_{k+N-1|k}$

Figure 3:
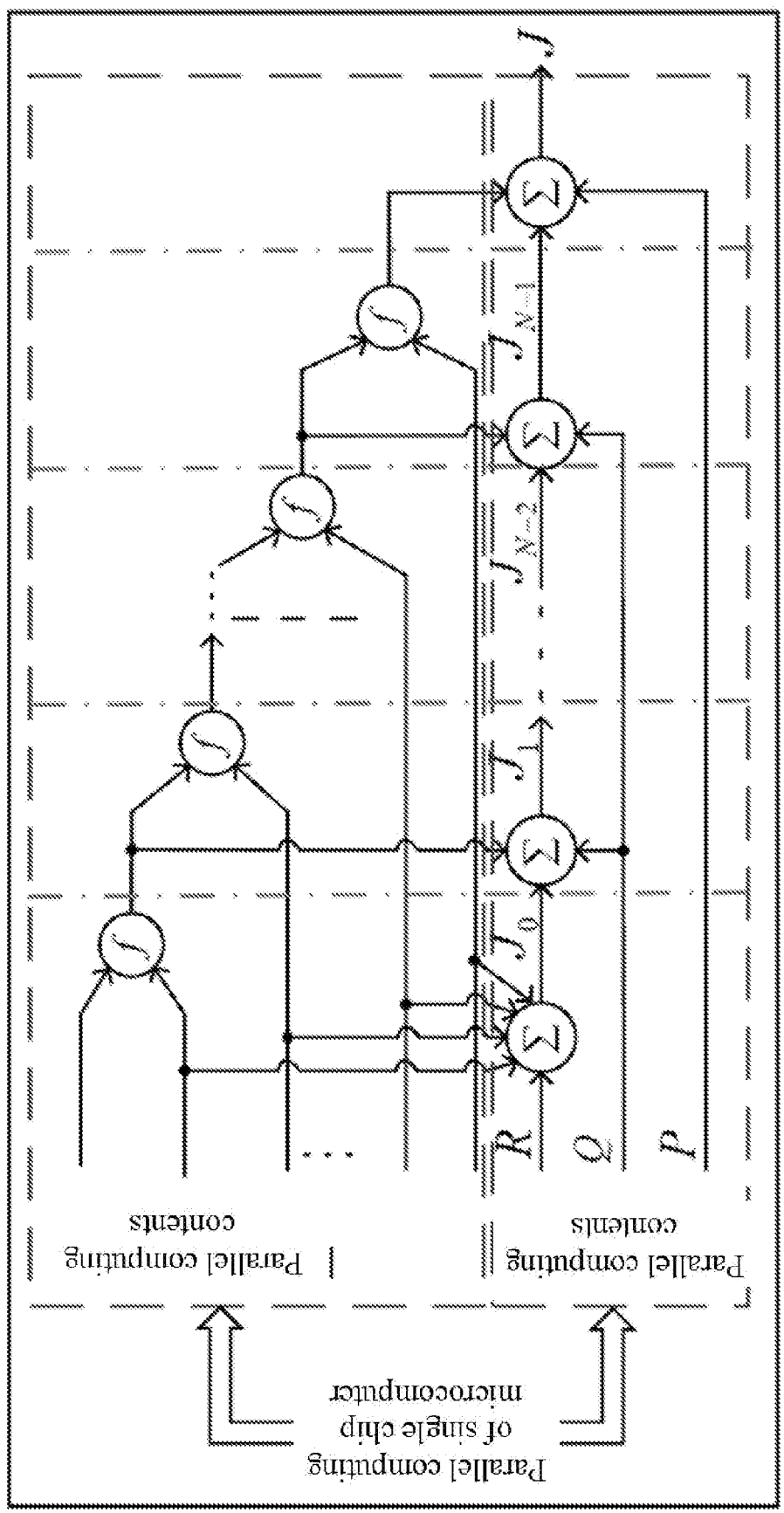
FIG. 3 is a diagram for a parallel computing architecture of the present invention.

-continued $x_{k+N|k} = f(x_{k+N-1|k}, u_{k+N-1|k})$ $\left. \frac{\partial f}{\partial x} \right|_{(x_{k+N-1|k}, u_{k+N-1|k})}$ $\left. \frac{\partial f}{\partial u} \right|_{(x_{k+N-1|k}, u_{k+N-1|k})}$ In the process of forward recurrence, computing of the target function is performed synchronously, as shown in FIG. 3. Since data in parallel tasks is not completely independent, a coupling exists. However, for a prediction process of each step, data is independent. In this regard, the present invention combines a triggering parallel computing manner, i.e. using a symbol indicating that solution of the forward inference in step N (i.e. No. 1 parallel computing content) and the target function (i.e. No. 2 parallel computing content) as a symbol of starting computing for prediction in step N+1, so as to ensure sequence of the data computing number and finally achieve the purpose of the shortening the computing time.

S3: solving and computing a gradient with a manner of back propagation and using a gradient descent method to optimize a control amount of the system and realize real time optimal control of the system.

Figure 4:
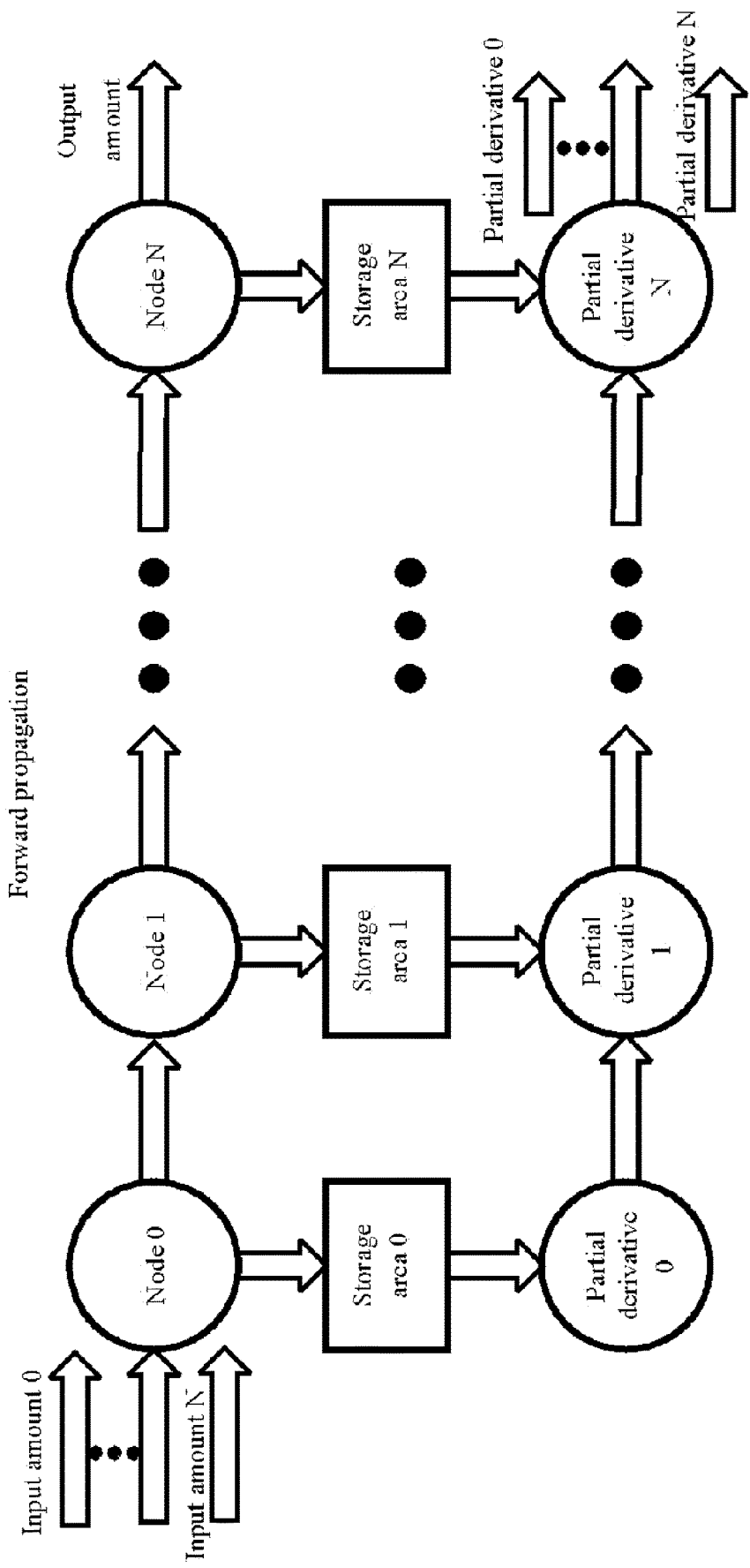
FIG. 4 is a schematic diagram of a computing manner for forward propagation.
Figure 5:
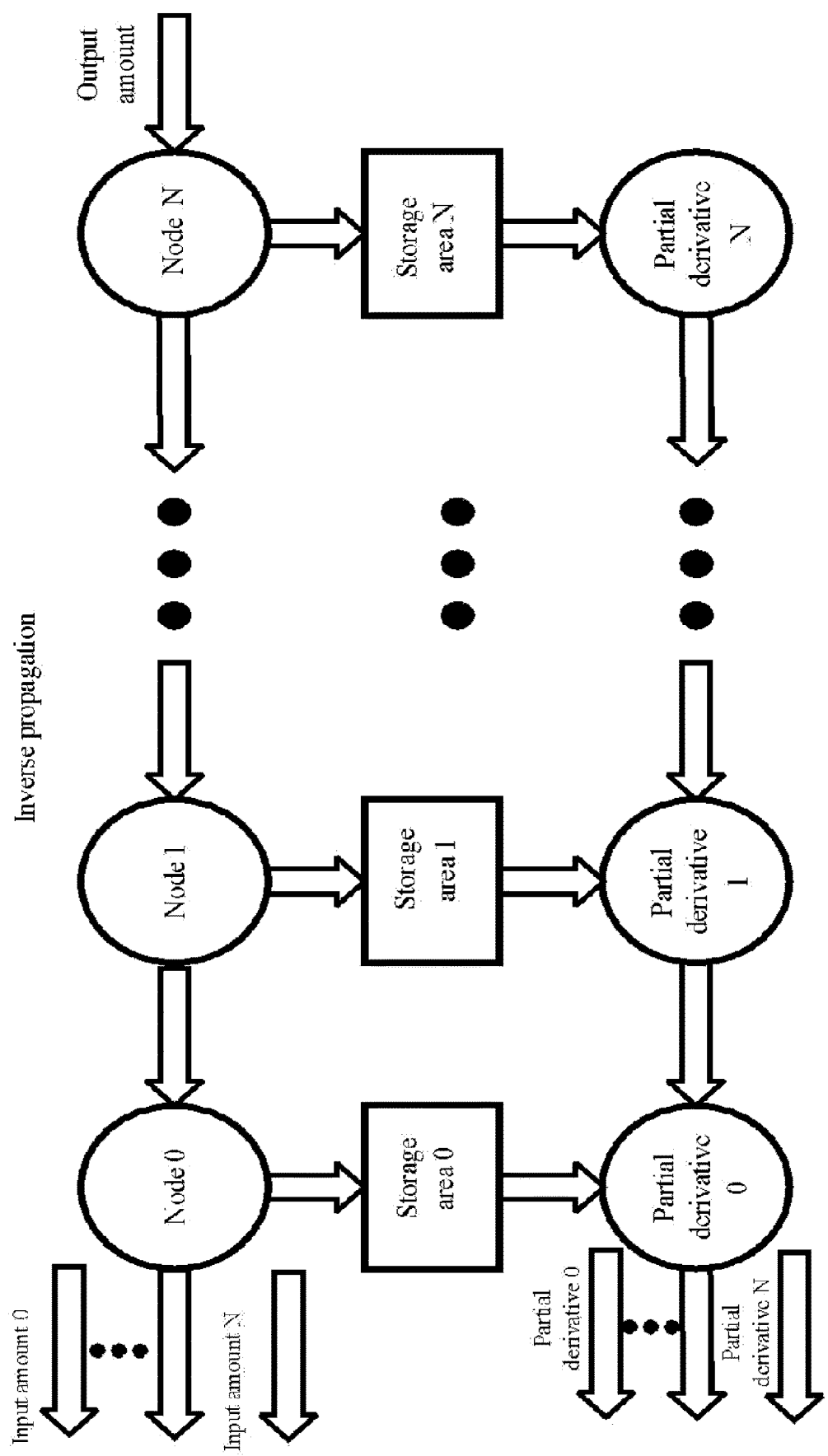
FIG. 5 is a schematic diagram of a computing manner for back propagation.

Through a calculating gradient of back propagation, i.e. partial derivatives stored correspondingly by needed nodes are taken out in order and multiplied to obtain a gradient of the target function to the input amount. Since N control amounts exist in an entire control time domain, one control amount outputs a control model of a variable. For forward solution, partial derivatives of the target function to each input can only be computed by traversing all nodes N times. For inverse solution, it is only necessary to traverse all nodes once, to thus calculate the partial derivative of the target function to each input. The solution processes thereof are respectively shown in FIG. 4 and FIG. 5.

The step S3 specifically comprises:

S31: building a plurality of computing nodes, and setting one storage unit for each computing note, the storage unit storing a related computing parameter;

S32: obtaining a gradient of a target function for an input amount based on back propagation according to the computing parameter in the plurality of computing nodes; and S33: using a gradient descent method to optimize a control amount of the system, and obtaining an optimal control sequence, thereby realizing parallel prediction control of the system.

The step S33 specifically comprises:

using a gradient descent method to optimize a control amount:

$u_{k|k}, u_{k+1|k} \ldots u_{k+N-1|k}$, wherein $u_{k|k}, u_{k+1|k} \ldots u_{k+N-1|k}$ is respectively a control amount in step 0, 1 ... N−1 within moment k, completing an optimization process when one of optimization conditions is satisfied, thereby obtaining an optimal control sequence $U^*_k$:

$U^*_k = [u^*_{k|k}, u^*_{k+1|k} \ldots u^*_{k+N-1|k}]$, wherein $u^*_{k|k}, u^*_{k+1|k} \ldots u^*_{k+N-1|k}$ is respectively a desired value of a control amount in step 0, 1 ... N−1 within moment k, using a first element $u^*_{k|k}$ in the obtained optimal control sequence $U^*_k$ as a control amount at moment k, and a new control sequence consisting of a zero element added after an element subsequent to the first element as an initial value of a prediction control input matrix at moment k+1, i.e. $U_{0|k+1}=[u^*_{k+1|k}, u^*_{k+2|k} \ldots u^*_{k+N-1|k}, 0]$, and ending an prediction and optimization process at moment k, and repeating the above steps to complete a prediction and optimization process at moment k+1.

A computing formula of the optimal control sequence is:

$$u^*_{k|k} = u^*_{k-1|k-1} - \frac{\partial J}{\partial u_{k|k}}\Delta t$$

$$u^*_{k+1|k} = u^*_{k|k} - \frac{\partial J}{\partial u^*_{k+1|k}}\Delta t$$

$$\vdots$$

$$u^*_{k+N-1|k} = u^*_{k+N-2|k} - \frac{\partial J}{\partial u^*_{k+1|k}}\Delta t$$

wherein $u^*_{k+i|k}$ is a desired value of a control amount of step i at moment k, $u^*_{k-1|k-1}$ is an optimal control amount of the previous moment and $\Delta t$ is a control step size.

In the embodiment, the system is a vehicle model, and the prediction model is a vehicle path and speed tracking model for parallel computing in considering the following three degrees of freedom (DOFs) vehicle nonlinear model:

$$\begin{cases} \dot{v}_x = v_y r + a_x \\ \dot{v}_y = v_x r + \frac{2(C_f + C_r)v_y}{mv_x} + \frac{2r(aC_f - bC_r)}{mv_x} - \frac{2C_f}{m}\delta_f \\ \dot{\varphi} = r \\ \dot{r} = \frac{2v_y(aC_f - bC_r)}{I_z v_x} + \frac{2r(a^2 C_f + b^2 C_r)}{I_z v_x} - \frac{2aC_f}{I_z}\delta_f \\ \dot{X} = v_x \cos\varphi - v_y \sin\varphi \\ \dot{Y} = v_x \sin\varphi + v_y \cos\varphi \end{cases}$$

Wherein $v_x$ is a vehicle longitudinal speed; $v_y$ is a vehicle horizontal speed, $a_x$ is a longitudinal acceleration, r is a yaw rate, $C_f$ is a front wheel cornering stiffness, $C_r$ is a rear wheel cornering stiffness, m is a total weight, a,b is a distance from a centroid to a front shaft and a rear shaft, $\delta_f$ a front wheel steering angle, $I_x$ is a rotational inertia of a vehicle centroid about shaft z and $\varphi$ is a heading angle of a vehicle.

Therefore, a vehicle continuous nonlinear model can be rewritten as:

$$\dot{x}=f(x, u)$$

system state prediction (forward propagation).

Firstly, the continuous system models are discretized. In order to improve discretization accuracy, a three-order three-section Runge-Kutta formula is used for discretization to obtain a system discrete model.

$$\begin{cases} k_1 = T_s f(x_k, u_k) \\ k_2 = T_s f\left(x_k + \frac{1}{2}k_1, u_k\right) \\ k_3 = T_s f(x_k - k_1 + 2k_2, u_k) \\ x_{k+1} = x_k + \frac{1}{6}(k_1 + 4k_2 + k_3) \end{cases}$$

Then, an initial value is given for control input and it is N in a control time domain and a prediction time domain both. Due to a dual-input system, the initial value is set as a column vector of row 1 in line 2N.

$$U=[u_{(0)}^T u_{(1)}^T \ldots u_{(N-1)}^T]^T$$

An initial state is x(0) and state prediction is computed according to formula (7).

The control objective of a vehicle path and speed tracking model is:

rapidly and accurately tracking a vehicle longitudinal velocity $v_x$ and a lateral displacement Y, and setting a control time domain and a prediction time domain both as N and a target function as $$\min_U J = \sum_{i=0}^{N-1}(x_i^T Q x_i + u_i^T R u_i) + x_N^T P x_N$$

wherein $x_i$ is a state amount of step i at a present moment, $u$ is a system control amount of step i at the present moment, Q is a positive weight matrix, P is a positive terminal penalty matrix and R is a positive control amount penalty matrix.

The target function is decomposed as follows upon being computed:

$$J_0 = g(U) = \sum_{i=0}^{N-1} u_i^T R u_i$$

$$J_i = h(y_i, J_{i-1}) = J_{i-1} + (y_i - y_r)^T Q(y_i - y_r)$$

$$= (x_{ji} - x_{jr})^T Q(x_{ji} - x_{jr}), j = 1, 6, i = 1, 2, \ldots, N$$

wherein g and h are respectively a decomposition computing function.

According to the computing chart model of FIG. 2, it is divided into N layers and one layer is computed each time upon forward prediction and inverse derivation.

With $$A_k = \frac{\partial x_{k+1}}{\partial x_k} \text{ and } B_k = \frac{\partial x_{k+1}}{\partial u_k},$$

the following can be computed according to the system discrete model:

$$A_k = I + T_s A_{c,k} + \tfrac{1}{2}T_s^2 A_{c,k}^2 + \tfrac{1}{6}T_s^3 A_{c,k}^3$$

$$B_k = T_s B_{c,k} + \tfrac{1}{2}T_s^2 A_{c,k} B_{c,k} + \tfrac{1}{6}T_s^3 A_{c,k}^2 B_{c,k}$$

Wherein $A_{c,k}$ is a Jacobi matrix of $f$ to x at $(x_k, u_k)$ and $B_{c,k}$ is a Jacobi matrix of $f$ to $u$ at $(x_k, u_k)$.

According to the computing chart model of FIG. 2, a local partial derivative of each layer can be computed in order as follows:

$$\frac{\partial J}{\partial x_N} = 2x_N^T P, \frac{\partial J}{\partial J_{N-1}} = 1$$

For the N−1th layer:

$$\frac{\partial x_N}{\partial x_{N-1}} = A_{N-1}, \frac{\partial x_N}{\partial u_{N-1}} = B_{N-1}$$

Figure 6:
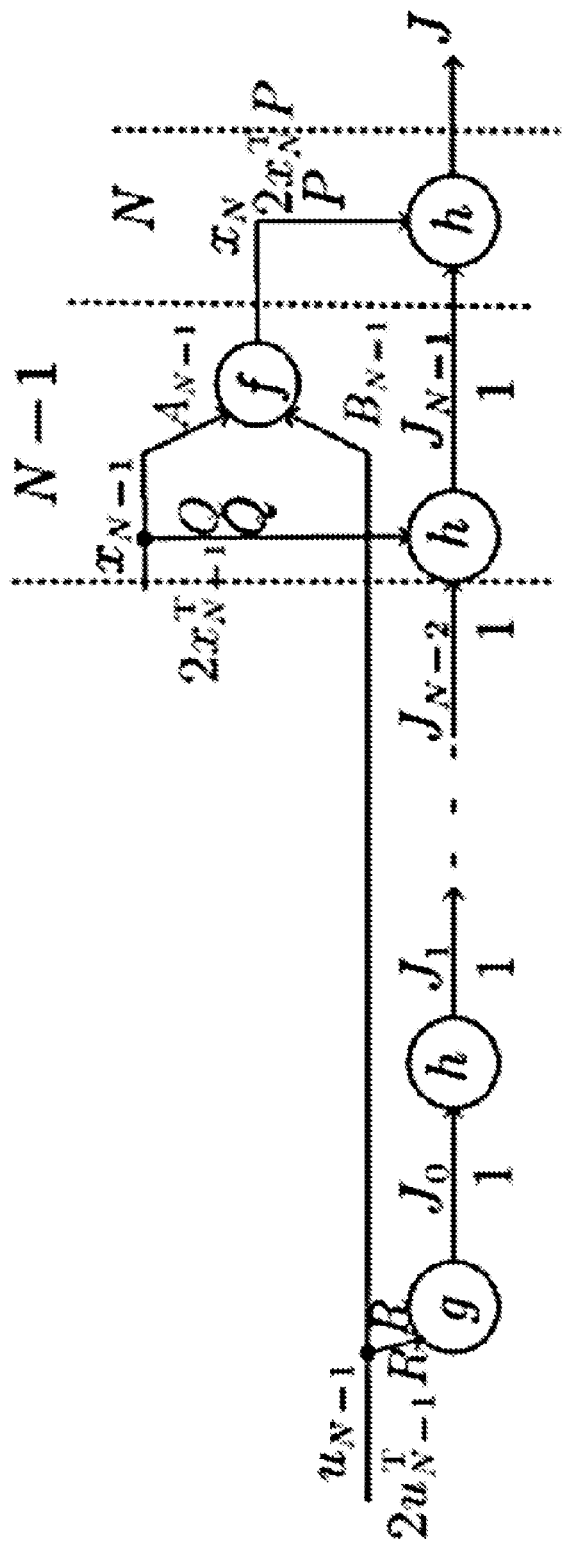
FIG. 6 is a partial computing chart of a gradient descent method.

-continued $$\frac{\partial J_{N-1}}{\partial x_{N-1}} = 2x_{N-1}^T B, \frac{\partial J_{N-1}}{\partial J_{N-2}} = 1$$

after obtaining the local partial derivative, the following can be solved according to FIG. 6 and a chain rule:

$$\frac{\partial J}{\partial x_{N-1}} = \frac{\partial J}{\partial x_N}\frac{\partial x_N}{\partial x_{N-1}} + \frac{\partial J}{\partial J_{N-1}}\frac{\partial J_{N-1}}{\partial x_{N-1}}$$

$$= \frac{\partial J}{\partial x_N} A_{N-1} + 2x_{N-1}^T Q$$

and $$\frac{\partial J}{\partial u_{N-1}} = \frac{\partial J}{\partial x_N}\frac{\partial x_N}{\partial u_{N-1}} + \frac{\partial J}{\partial J_{N-1}}\frac{\partial J_{N-1}}{\partial u_{N-1}}$$

$$= \frac{\partial J}{\partial x_N} B_{N-1} + 2u_{N-1}^T R$$

It can be seen that $$\frac{\partial J}{\partial x_N}$$

solved at the Nth layer is used for solution of both $$\frac{\partial J}{\partial x_{N-1}} \text{ and } \frac{\partial J}{\partial u_{N-1}},$$

and the computing of the two does not relate to each other, such that it can performed in parallel.

With the previous layer similar to the N−1th layer, recurrence can be made by combining FIG. 2 to obtain $$\frac{\partial J}{\partial x_i}$$

and the needed $$\frac{\partial J}{\partial u_i}$$

$$\frac{\partial J}{\partial x_i} = \frac{\partial J}{\partial x_{i+1}} A_i + 2x_i^T Q, i = 1, 2, \ldots, N-1$$

$$\frac{\partial J}{\partial u_i} = \frac{\partial J}{\partial x_{i+1}} B_i + 2u_i^T R, i = 0, 1, \ldots, N-2$$

To sum up, by inputting formulas of weight matrices R, Q and P, and the Jacobi matrix of the system, $A_i$ and $B_i$ corresponding to the future $x_i$ can be solved according to the prediction state of the Runge-Kutta formula and solution formulas of $A_k$ and $B_k$, and computing can be performed according to the recurrence formula to obtain the gradient of the target function to the optimization variable.

$$\nabla J(U) = \left[\left(\frac{\partial J}{\partial u_0}\right)^T \left(\frac{\partial J}{\partial u_1}\right)^T \cdots \left(\frac{\partial J}{\partial u_{N-1}}\right)^T\right]^T$$

Each iteration updates control input along a direction opposite to the gradient.

$$U^{(k+1)} = U^{(k)} - s \nabla J(U^{(k)})$$

Simulation Experiment Result

The prediction time domain and the control time domain: N=10 and s=0.01, and weight matrices R=S=0 and P=Q=diag(0.5, 0, 0.2, 0.2, 0, 0.5) are taken. The reference path $y_{ref}$ to be tracked is:

$$y_{ref} = \begin{cases} 0, & X_{pre} < 200 \text{ m} \\ 3\sin\left(\frac{\pi}{100}X_{pre}\right), & 200 \le X_{pre} < 600 \text{ m} \\ 0, & X_{pre} > 600 \text{ m} \end{cases}$$

wherein $X_{pre}$ is a lateral prediction displacement.

An initial vehicle speed is 15 m/s and a reference speed $v_{x,ref}$ is:

$$v_{x,ref} = \begin{cases} 25, & X_{pre} < 400 \text{ m} \\ \sqrt{\frac{625-}{2(X_{pre}-400)}}, & 200 \le X_{pre} < 600 \text{ m}^{dand} \sqrt{\frac{625-}{2(X_{pre}-400)}} \ge 20 \\ 20, & 200 \le X_{pre} < 600 \text{ m}^{dand} \sqrt{\frac{625-}{2(X_{pre}-400)}} < 20 \\ \sqrt{\frac{400-}{X_{pre}-600}}, & X_{pre} > 600 \text{ m}^{dand} \sqrt{\frac{400-}{2(X_{pre}-600)}} \ge 15 \\ 15, & X_{pre} > 600 \text{ m}^{dand} \sqrt{\frac{400-}{2(X_{pre}-600)}} < 15 \end{cases}$$

Figure 7:
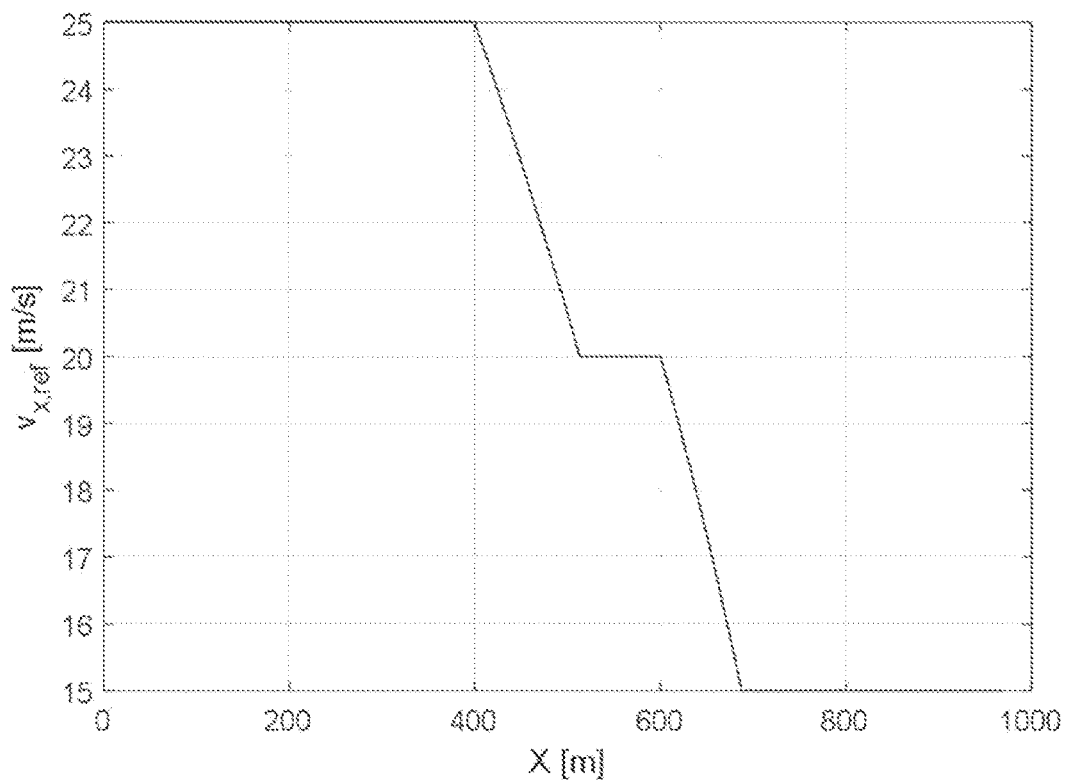
FIG. 7 is a curve diagram of a reference speed.
Figure 8:
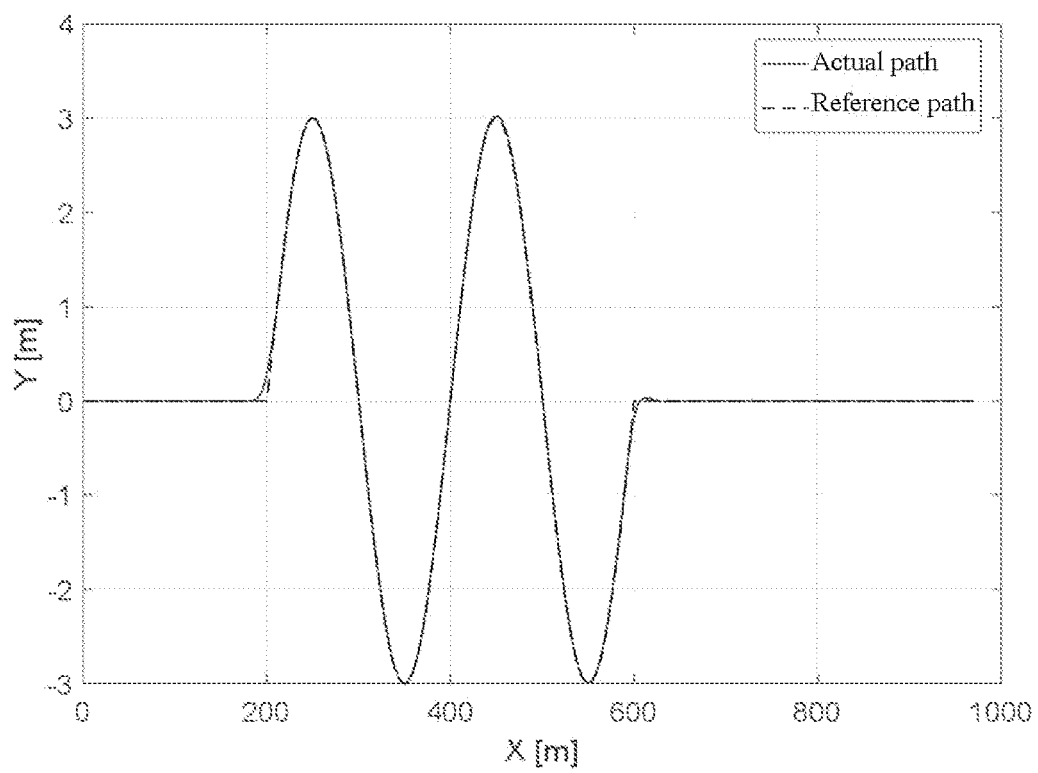
FIG. 8 is a curve diagram of path tracking.
Figure 9:
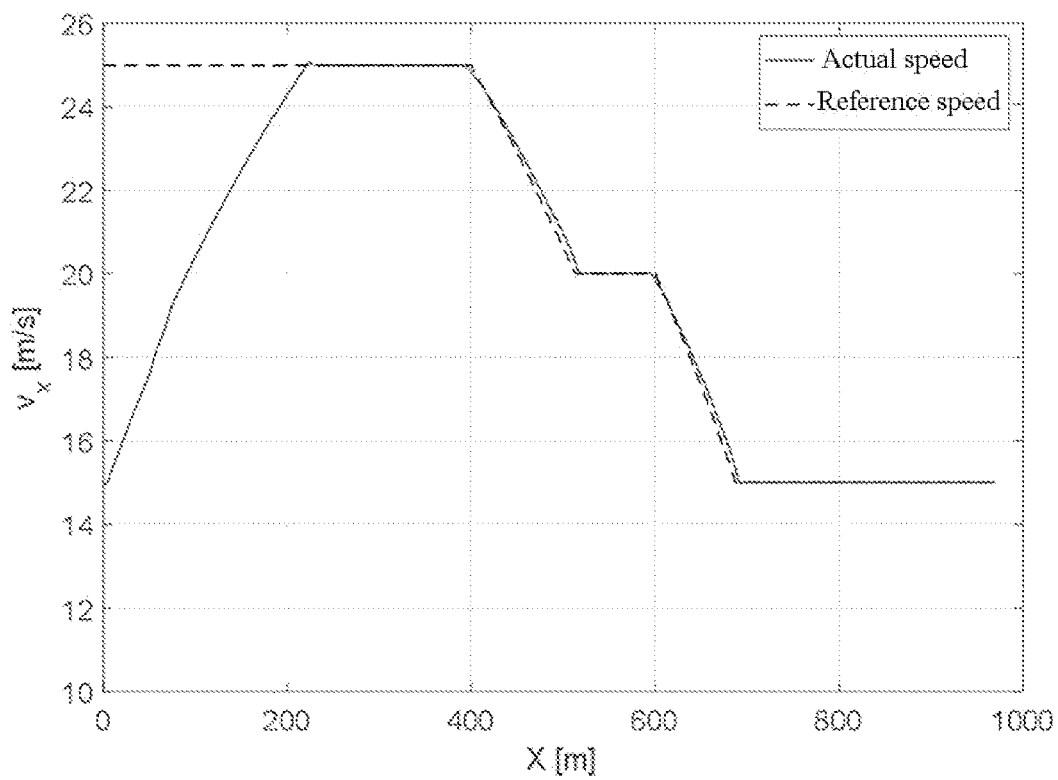
FIG. 9 is a curve diagram of speed tracking.
Figure 10:
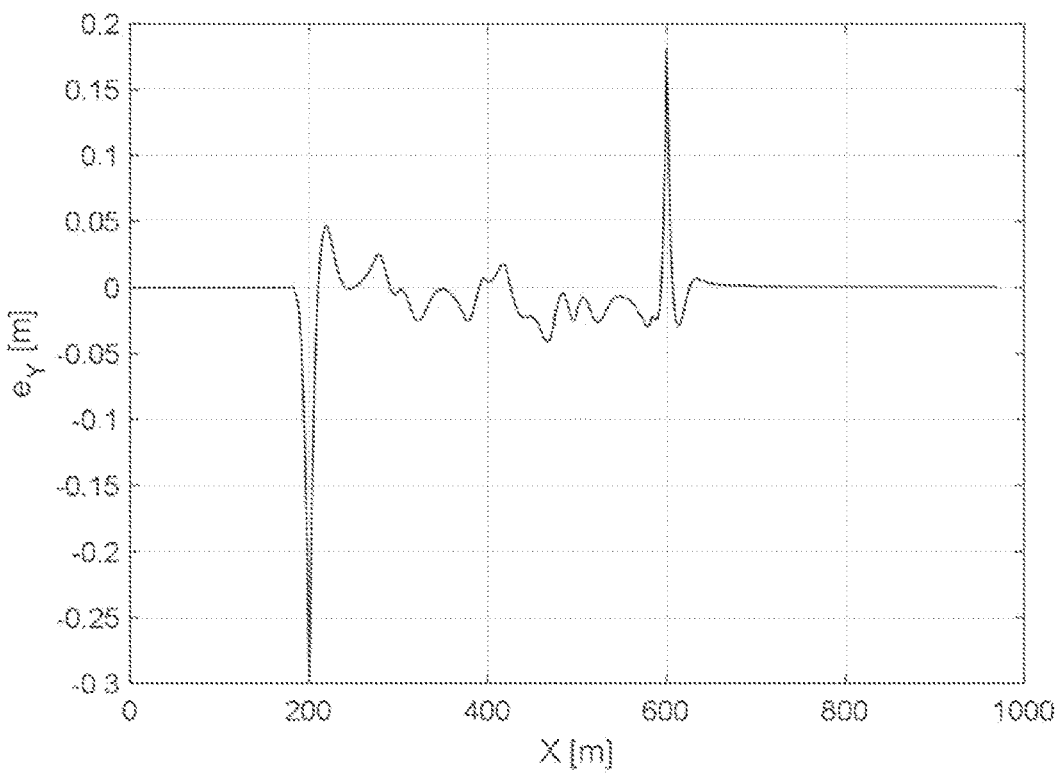
FIG. 10 is an error curve diagram of displacement tracking.
Figure 11:
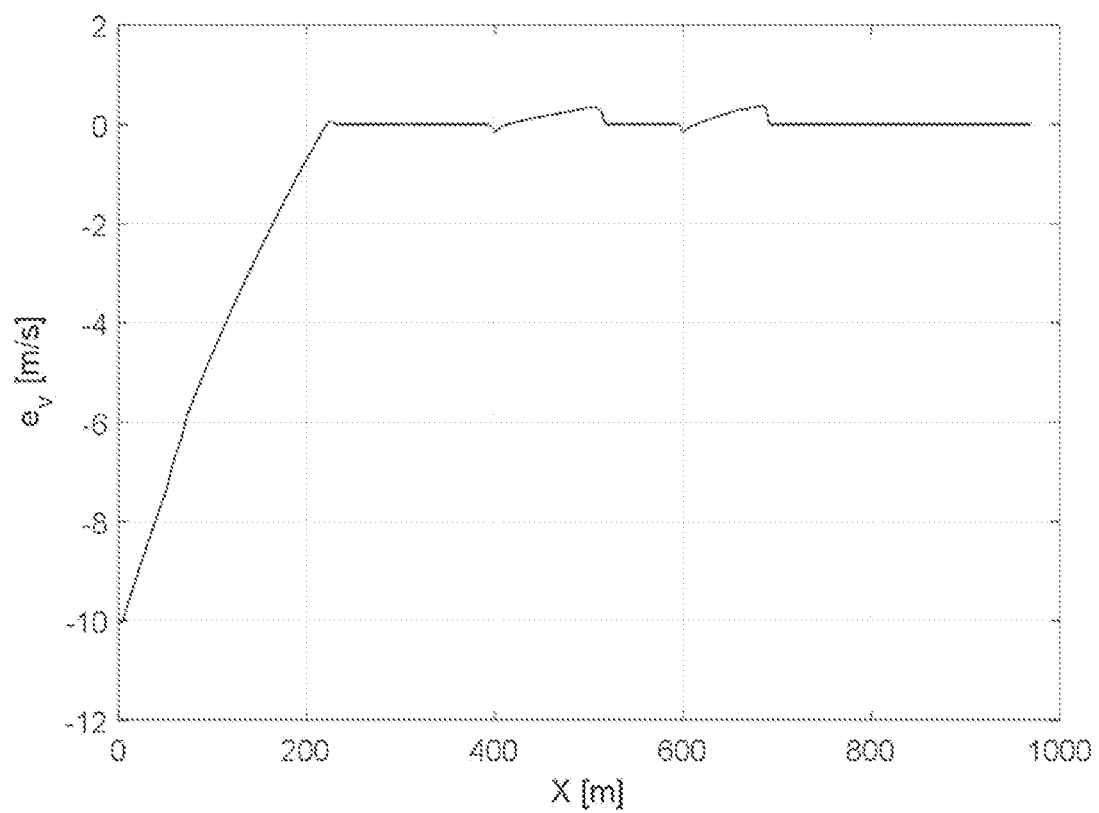
FIG. 11 is an error curve diagram of speed tracking.

The reference speed curve is shown in FIG. 7 and the acceleration at a speed reducing stage is set as −1 m/s. The result of the vehicle path and speed tracking curve is shown in FIGS. 8 and 9 and the displacement and speed tracking error curve is shown in FIGS. 10 and 11.

The embodiments are merely illustrative and do not limit the scope of the present invention. These embodiments can also be implemented in other various manners and various omissions, replacements and modifications can be made without departing from the scope of the technical concept of the present invention.

What is claimed is:

1. A method for a real time optimization and a parallel computing of a model prediction control based on a computing chart, wherein the method comprises the following steps:
    S1: building a prediction model of a system state amount and building a target function of a system, wherein the system is a vehicle model and the prediction model is a vehicle path and a velocity tracking model;
    S2: building a parallel computing architecture for the model prediction control of the prediction model and the target function and employing a triggering parallel computing method by the parallel computing architecture to synchronously compute the prediction model and the target function; and
    S3: solving and computing a gradient with a manner of a back propagation and using a gradient descent method to optimize a control amount of the system and realize a real time optimal control of the system;
wherein a control objective of the vehicle path and the velocity tracking model is:
rapidly and accurately tracking a vehicle longitudinal velocity $v_x$ and a lateral displacement Y, and setting a control time domain and a prediction time domain both as N and the target function as $$\min_U J = \sum_{i=0}^{N-1}(x_i^T Q x_i + u_i^T R u_i) + x_N^T P x_N$$

wherein $x_i$ is a state amount of a step i at a present moment, $u_i$ is a system control amount of the step i at the present moment, Q is a positive weight matrix, P is a positive terminal penalty matrix and R is a positive control amount penalty matrix;
wherein in the parallel computing architecture for the model prediction control in the step S2, a symbol indicating that a solution of the prediction model and the target function in a present step has been completed is used as the symbol of starting a prediction computing at a next step, thereby realizing parallel computing of the prediction model and the target function;
wherein the step S3 specifically comprises:
S31: building a plurality of computing nodes, and setting one storage unit for each of the computing nodes, the storage unit storing a related computing parameter;
S32: obtaining the gradient of the target function for an input amount based on a back propagation according to the related computing parameter in the plurality of computing nodes; and
S33: using the gradient descent method to optimize the control amount of the system, and obtaining an optimal control sequence, thereby realizing parallel prediction control of the system;
wherein the step S33 specifically comprises:
using the gradient descent method to optimize the control amount:

$u_{k|k} u_{k-1|k} \ldots u_{k+N-1|k}$, wherein $u_{k|k} u_{k+1|k} \ldots u_{k+N-1|k}$ is a control amount in step 0, 1 . . . N−1 within a moment k,
completing an optimization process when one of optimization conditions is satisfied, thereby obtaining the optimal control sequence $U^*_k$:

$U^*_k = [u^*_{k|k} u^*_{k+1|k} \ldots u^*_{k+N-1|k}]$, wherein $u^*_{k|k} u^*_{k+1|k} \ldots u^*_{k+N-1|k}$ is a desired value of a control amount in step 0, 1 . . . N−1 within moment k,
using a first element $u^*_{k|k}$ in the obtained optimal control sequence $U^*_k$ as a control amount at moment k, and a new control sequence consisting of a zero element added after an element subsequent to the first element as an initial value of a prediction control input matrix at moment k+1, i.e. $U_{0|k+1} = [u^*_{k+1|k} u^*_{k+2|k} \ldots u^*_{k+N-1|k}, 0]$, and ending an prediction and optimization process at moment k, and
repeating the above steps to complete a prediction and optimization process at the moment k+1;
wherein an optimization condition is that a difference value between the target function of a present iterative step size and the target function of a previous step is smaller than a set value or reaches limited optimization times or a changing amount of the target function is 0.

2. The method for the real time optimization and the parallel computing of the model prediction control based on the computing chart according to claim 1, wherein a recurrence relationship between the prediction model and the target function is:

$$i = 0 \quad J_0 = \sum_{i=0}^{N-1} \Delta u_{k+i|k}^T R \Delta u_{k+i|k} \quad x_{k+1|k} = f(x_{k|k}, u_{k|k})$$

$$i = 1 \quad J_1 = J_0 + x_{k+1|k}^T Q x_{k+1|k} \quad x_{k+2|k} = f(x_{k+1|k}, u_{k+1|k})$$

$$\vdots$$

$$i = N-1 \quad J_{N-1} = J_{N-2} + x_{k+N-1|k}^T Q x_{k+N-1|k} \quad x_{k+N|k} = f(x_{k+N-1|k}, u_{k+N-1|k})$$

$$i = N \quad J = J_{N-1} + x_{k+N|k}^T P x_{k+N|k}$$

J wherein is the target function, $f$ is the prediction model of the system, $x_{k+i|k}$ is the system state amount in a step i at a moment k and $u_{k+i|k}$ is a system control amount in the step i at the moment k.

3. The method for the real time optimization and the parallel computing of the model prediction control based on the computing chart according to claim 1, wherein a computing formula of an optimal control sequence is:

$$u^*_{k|k} = u^*_{k-1|k-1} - \frac{\partial J}{\partial u_{k|k}} \Delta t$$

$$u^*_{k+1|k} = u^*_{k|k} - \frac{\partial J}{\partial u^*_{k+1|k}} \Delta t,$$

$$\vdots$$

$$u^*_{k+N-1|k} = u^*_{k+N-2|k} - \frac{\partial J}{\partial u^*_{k+1|k}} \Delta t$$

wherein $u^*_{k+i|k}$ is a desired value of the control amount of a step i at a moment k, $u^*_{k-1|k-1}$ is an optimal control amount of a previous moment and $\Delta t$ is a control step size.

4. The method for the real time optimization and the parallel computing of the model prediction control based on the computing chart according to claim 1, wherein the target function is decomposed as follows upon being computed:

$$J_0 = g(U) = \sum_{i=0}^{N-1} u_i^T R u_i$$

$$J_i = h(y_i, J_{i-1}) = J_{i-1} + (y_i - y_r)^T Q (y_i - y_r)$$

$$= (x_{ji} - x_{jr})^T Q (x_{ji} - x_{jr}), j = 1, 6, i = 1, 2, \ldots, N$$

wherein g and h are respectively a decomposition computing function.

* * * * *